United States Patent [19]
Turk et al.

[11] Patent Number: 5,569,912
[45] Date of Patent: Oct. 29, 1996

[54] OPTICAL VELOCITY MEASURING WITH EFFICIENT USE OF RADIATION PASSING THROUGH PATTERNS ON DISCS

[75] Inventors: Everardus T. G. Turk; Gerard Van Engelen; Jannis P. Van Der Linde, all of Eindhoven, Netherlands

[73] Assignee: U.S. Philips Corporation, New York, N.Y.

[21] Appl. No.: 315,152

[22] Filed: Sep. 29, 1994

Related U.S. Application Data

[63] Continuation-in-part of Ser. No. 230,942, Apr. 21, 1994, abandoned.

[30] Foreign Application Priority Data

Sep. 30, 1993 [BE] Belgium ..................... 9301026
Jun. 7, 1994 [EP] European Pat. Off. ............ 94201618

[51] Int. Cl.⁶ .................................. G01D 5/34
[52] U.S. Cl. ................ 250/231.14; 250/231.18; 360/73.14
[58] Field of Search .............. 250/231.14, 231.17, 250/231.18, 231.13, 237 R, 559.32; 360/73.04, 73.14, 73.11, 73.09, 71; 242/334.3, 334.4, 413.9; 356/430, 238

[56] References Cited

U.S. PATENT DOCUMENTS

| 3,040,222 | 6/1962 | Kunz et al. ..................... 318/32 |
| 3,809,335 | 5/1974 | Mantey ......................... 242/186 |
| 3,912,926 | 10/1975 | Coulbourn . |
| 4,637,264 | 1/1987 | Takahashi et al. ............ 250/231.14 |
| 4,658,132 | 4/1987 | Nishiura et al. ............... 250/231 |
| 4,788,422 | 11/1988 | Fujiwara ..................... 250/231.13 |
| 5,259,563 | 11/1993 | Kakiwaki et al. ............. 360/73.14 |

FOREIGN PATENT DOCUMENTS

| 0504973 | 9/1992 | European Pat. Off. . |
| 2113895 | 6/1972 | France . |
| 1330923 | 9/1973 | United Kingdom . |

Primary Examiner—Que T. Le
Attorney, Agent, or Firm—David Treacy

[57] ABSTRACT

A device for measuring the angular velocity of a rotating object (35) is described, which device comprises a first disc (23) moving with the object and having a rotationally symmetrical pattern of interruptions (24), and a second disc (29) having a similar pattern and a detector (34) which receives radiation passed by the patterns and converts it into an electric measuring signal. The device is very accurate, reliable and compact. The linear velocity of an elongated object, for example a recording tape, can also be measured with the device.

26 Claims, 8 Drawing Sheets

OPTICAL VELOCITY MEASURING WITH EFFICIENT USE OF RADIATION PASSING THROUGH PATTERNS ON DISCS

This application is a continuation-in-part of application Ser. No. 08/230,942, filed Apr. 21, 1994, now abandoned.

BACKGROUND OF THE INVENTION

The invention relates to a device for optically measuring the angular velocity of a rotating object, which device comprises:
a rotatable first disc adapted to be driven by the object, and a second disc, both discs being provided with a periodical and rotationally symmetrical pattern of elongated interruptions in a disc face;
an illumination system for simultaneously illuminating the complete pattern; and
a detection system.

The invention also relates to a device of this type which is made suitable for measuring the linear velocity of an elongated object.

The invention further relates to a capstanless tape scanning apparatus provided with two reels to be used as supply reel and take-up reel, a scanning head arranged in the path covered by the tape between the two reels and a tape speed control loop comprising a tape speed sensor and a control circuit for controlling the speed of a motor for a reel functioning as the take-up reel.

An optical angular velocity measuring device is known from U.S. Pat. No. 4,658,132.

Capstanless tape scanning apparatuses are known in various embodiments and described in, inter alia GB Patent Specification 1,330,923 and U.S. Pat. No. 3,809,335. As has been noted in the GB Patent Specification, the use of a capstan in combination with a pressure mechanism for driving a tape at a constant linear speed has the advantage that an accurate control of the tape speed can be realised at minimal cost as far as the control itself is concerned. However, when a capstan is used, a number of drawbacks occur, three of which have been mentioned in the British Patent Specification, viz. a complicated mechanism for introducing the cassette, difficult guidance of the edges of the tape and a greater risk of damage of the tape. Moreover, there are problems of contamination and a slipping tape. Said drawbacks and problems can be prevented by driving the tape in a different manner than with the aid of a capstan, viz. by means of the supply reel and/or the take-up reel. In this case, provisions have to be made to keep the tape speed constant at the location of the scanning head. A possible provision mentioned in the GB Patent Specification GB 1,330,923 is the use of a tape-driven tachometer which is not further described and, moreover, is discarded as being less suitable. In the GB Patent Specification a choice is made for a system in which one of the reels is driven by means of a control signal and a non-linear signal which is superimposed thereon and is inversely proportional to the diameter of the tape on the relevant reel. In a capstanless tape scanning apparatus in which the tape speed is controlled by the driving mechanism of the take-up reel, a slip coupling should be present in this driving mechanism, which slip coupling leads to loss of energy. U.S. Pat. No. 3,809,335 describes a tape driving apparatus in which the supply reel and the take-up reel are driven and in which acceleration, deceleration, speed, as well as tape tension are measured. This apparatus does not comprise a separate tape speed measuring station.

Since the scanning head of a tape player is present at some distance from both the supply reel and the take-up reel, it is preferred to use a separate speed measuring station which is arranged close to the scanning head so that the speed is measured at the location where the speed should be constant. The signal of the speed measuring station may alternatively be used as a time base correction when processing the information signal read from the tape. It is further preferred to use an optical measuring device because such a device can be implemented at low cost and at small dimensions by means of the present-day techniques and because it has a high resolving power and a great measuring accuracy. As compared with a magnetic angular velocity sensor, the optical sensor has the advantages that the quality of the measured output signal is less dependent on the range of revolution frequencies in which the measurements take place and that it is less sensitive to electric interference. In a magnetic sensor, disturbing interactions between the magnet and the bearings may occur.

The optical angular velocity measuring device described in U.S. Pat. No. 4,658,132 and intended for measuring the angular velocity of a motor could be considered for use in a tape speed measuring station. The device described in U.S. Pat. No. 4,658,132 comprises a first disc rotating with the motor shaft, on which disc interruptions in the form of light-transmissive slits are arranged in the form of a ring, and a second stationary disc which is provided with a plurality of radiation-sensitive detection elements also arranged in a ring, the number of detection elements corresponding to the number of slits on the rotatable disc. This disc is illuminated and the radiation passing through the slits is received by the detection elements. When the motor is rotated, the slits are displaced with respect to the detection elements so that maximum and minimum quantities of radiation are alternately received by the detection elements. The sum of the output signals of these elements is a periodical signal whose frequency represents the angular velocity of the slotted disc and hence that of the motor.

German Patent Application 2 155970 describes another angular velocity sensor comprising a circularly bent tubular radiation source within which a rotating slotted drum and a stationary slotted drum are arranged, and in which a bundle of optical fibers transports the radiation passing through the two slotted drums to a detector.

SUMMARY OF THE INVENTION

It is an object of the present invention to provide a novel optical angular velocity measuring device which, as compared with that described in U.S. Pat. No. 4,658,132, has a number of advantages, the most important advantage being a higher resolving power and better use of the available radiation. The device according to the invention is characterized in that the illumination system comprises a radiation source in the form of a diode and a radiation guide which concentrates the source radiation to a beam whose cross-section is adapted to that of the pattern, and in that the detection system is constituted by a radiation guide for receiving radiation passing through the two patterns and coming from the illumination system, and for concentrating this radiation to a beam having a circular cross-section, and a single detector for converting the intensity variation of this beam into an electric signal.

The radiation source diode is a light-emitting diode (LED) or a semiconductor laser. The single detector is, for example a conventional photodiode. The angular velocity sensor is built up from conventional elements and very small and inexpensive elements.

The resolving power is now determined by the number of interruptions in the two discs. Very narrow interruptions and hence a large number of them can be provided on the discs by means of modern techniques. In the device described in U.S. Pat. No. 4,658,132 the accuracy is limited because the detection elements themselves and the strips between these elements must have a relatively large width so that the number of detection elements which can be provided on the stationary disc is limited. Since, according to the invention, the discs are illuminated with a beam having a uniform intensity distribution, a great accuracy can be achieved.

According to the invention, a device for measuring the absolute value of the angular velocity is further characterized in that the second disc is arranged to be stationary.

The device according to the invention may, however, also be characterized in that the second disc is driven at a constant angular velocity. The angular velocity can then be measured with respect to a reference velocity. This device may be used, for example, in an apparatus in which it is only important that the angular velocity is constant and equal to a reference value.

The above-mentioned devices may be further characterized in that one of the patterns is divided into a first and a second, periodical and rotationally symmetrical sub-pattern of interruptions whose periods are equal, the positions of the interruptions of the second sub-pattern being offset over a distance which is equal to one-fourth of the period of the sub-patterns with respect to the positions of the interruptions of the first sub-pattern, and in that a second detector is provided for receiving radiation passing through the second sub-pattern and the pattern of the other disc.

It is not only possible to determine the angular velocity or the magnitude of a deviation between this velocity and a reference speed by means of this device, but also the direction of the rotation or of the deviation with respect to the reference speed.

There are two classes of embodiments of the device according to the invention. The embodiments of the first class are characterized in that one of the discs is a round radiation-guiding disc whose pattern of interruptions is provided on the outer edge of the disc and in that the other disc is an annular radiation-guiding disc which is arranged around the other disc and whose pattern of interruptions is provided on the inner edge of the disc.

An advantageous embodiment of the first class is further characterized in that the illumination system is constituted by the annular disc and a radiation source located opposite the outer side of said disc, and in that the round disc is provided with a conical reflector and forms part of the radiation-collecting system.

Since the discs now not only function as careers for the patterns of interruptions but also form part of the illumination system which must supply a radiation beam having a uniform intensity distribution, and form part of the collecting system, the number of elements of the device can remain limited.

A preferred embodiment of the first class is characterized in that the annular disc is constituted by the raised edge of a radiation-guiding disc which is U-shaped in cross-section and is internally provided with a conical reflector, while one of its disc surfaces supports the radiation source and the other disc surface supports the detector, and in that the round disc is provided with a reflector.

This embodiment yields a better homogeneous illumination of the patterns than the first embodiment of the first class.

The second class of embodiments has the common characteristic feature that the first and second discs are round discs which are arranged opposite each other and that the patterns of interruptions on these discs are annular patterns.

An advantageous embodiment of the second class is characterized in that the two discs are radiation-guiding discs, one of which forms part of the illumination system and the other forms part of the collecting system, and in that radiation is trapped within the discs due to total internal reflection, while radiation can emerge from the disc associated with the illumination system via the pattern of interruptions in said disc, and radiation can enter the disc associated with the collecting system via the pattern of interruptions in said disc. The advantage of this embodiment is again that the number of elements of the device can remain limited.

The embodiments of both the first and the second class may be further characterized in that the interruptions are constituted by deformations in a smooth disc surface.

Advantageous use is made of the fact that radiation which, due to total internal reflection, remains trapped in this disc in the case of perfectly smooth disc surfaces may emerge from the disc at positions where surface deviations occur. The deformations may consist of grooves which can be provided easily and accurately, for example by means of scratching.

The embodiments of the first and the second class may alternatively be characterized in that the interruptions are constituted by transparent slits in an opaque disc surface.

Such slits can be accurately provided at low cost by means of photolithographic and replica techniques.

The embodiments of the first and the second class may be further characterized in that at least one of the discs is made of a transparent synthetic material. Such a synthetic material, for example polymethyl methacrylate (PMMA) not only has the property of being transparent but also the advantages that it is inexpensive and can easily be shaped, for example by means of moulding.

The embodiments of the second class may be further characterized in that the discs are opaque and the interruptions are constituted by slits in these discs, and in that the illumination system is adapted to supply a beam having an annular cross-section whose inner radius is at least equal to and whose outer radius is at most equal to the corresponding radii of the annular pattern of slits of the first and the second disc.

Said discs provided with slits, hereinafter referred to as slotted discs, can be made in a simple and inexpensive manner, for example, via a replica process from a master disc. If the radii of the annular beam cross-section, or the illumination ring, are equal to those of the annular slit structure, or the slotted ring, no measuring radiation will be lost, no false radiation may be produced and the slotted rings are completely illuminated so that inaccuracies are averaged out per slit and have no effect on the measurement.

If some tolerance is to be allowed for the mutual positioning of the slotted rings and the illumination ring, it is preferred to make the width of the illumination ring smaller than the width of the slotted rings.

However, it is alternatively possible to make the width of the illumination ring larger than that of the slotted rings so as to obtain a desired position tolerance.

It is to be noted that the abstract of JP Patent Application 61-228310 describes an angular position sensor not being a speed sensor in which an annular illumination beam is used.

However, the rotatable disc of this sensor has one slit only so that the available radiation is not used efficiently and the measuring result is dependent on the inaccuracies of the slit.

An embodiment of the device according to the invention, in which the radiation is efficiently transferred to the rotatable slotted disc so as to realise an annular, homogeneous illumination, is further characterized in that the illumination system successively comprises a radiation source, a first radiation guide and a rotatable, radiation-guiding disc having an oblique reflecting edge and being arranged proximate and parallel to the rotatable disc.

The first radiation guide ensures that all source radiation coupled therein remains available for the measurement and provides the possibility of a compact design of the illumination system. Due to its rotational symmetry, the rotatable radiation-guiding disc ensures uniformity of radiation and the oblique edge ensures that the radiation spot on the slotted disc is annular.

An embodiment of the device in which the radiation passed by the slotted discs is concentrated as efficiently as possible to a beam which is suitable to be supplied to the detector is characterized in that the composite detection system further comprises a second radiation-guiding disc having an oblique reflecting edge and being arranged at the side of the second slotted disc remote from the rotatable slotted disc, while a conical reflector is centrally arranged in said second radiation-guiding disc.

The oblique edge of the second radiation-guiding disc converts the annular radiation spot formed thereon into a fan of sub-beams directed towards the centre of the disc and the central cone reflects these sub-beams in one beam having a circular cross-section.

This embodiment may be further characterized in that at least one of the two radiation-guiding discs is made of a transparent synthetic material. This synthetic material may be PMMA again.

The embodiment in which two slotted discs are used is preferably further characterized in that a second radiation guide for guiding the radiation from the conical reflector to the detector is arranged between the second radiation-guiding disc and the detector.

An embodiment of the device according to the invention, which is advantageous from a constructive point of view, is further characterized in that the radiation source, the first radiation guide, the second radiation-guiding disc, the second radiation guide and the detector are arranged in a U shape and that a part of the first radiation guide constitutes the central portion of the U and has the shape of a hollow tube for accommodating a rotary shaft. This shaft may be fixedly connected to the object and thus rotate with this object. However, the shaft may alternatively be a stationary shaft, with the object rotating about it.

The last-mentioned embodiment provides the possibility of integrating the radiation source, for example in the form of a LED and the detector on one support and consequently limiting the number of components to be positioned separately.

The above-mentioned embodiments of the device may be further characterized in that the rotating object is a friction roll which is driven by a moving elongated object and thus transforms the device into a linear velocity measuring device.

In this way the field of application of the measuring device can be extended to those professional and consumer areas where linear velocities must be measured with great accuracy.

The invention further relates to a tape scanning apparatus provided with two reels to be used as supply reel and take-up reel, at least one scanning head arranged in the path covered by the tape between the two reels and a tape speed control loop comprising a tape speed sensor and a control circuit for controlling the speed of the reel functioning as the take-up reel. This apparatus is characterized in that the tape speed sensor is a linear velocity measuring device as mentioned above.

Since the tape speed sensor in such a consumer apparatus should be inexpensive and small but also accurate and reliable, the speed sensor according to the invention is eminently suitable for this purpose.

Such a tape scanning apparatus, which further comprises
a reproducing head for reproducing an information signal recorded on the tape,
a buffer memory, an input of which is coupled to an output of the reproducing head and an output of which is coupled to an output terminal for supplying the information signal,
first clock signal generator means for generating and supplying a first clock signal having a first clock frequency at an output which is coupled to a write clock signal input of the buffer memory, said buffer memory being adapted to store the information signal in response to the first clock signal,
second clock signal generator means for generating and supplying a second clock signal having a second clock frequency at an output which is coupled to a read clock signal input of the buffer memory, said buffer memory being adapted to supply the information signal stored in the buffer memory at the output in response to the second clock signal, one of the first or the second clock signal generator means being adapted to generate a clock signal having a fixed clock frequency,
detection means for determining a filling level of the buffer memory and for supplying a control signal at an output, which control signal is a measure of the filling level of the buffer memory, is further characterized in that an output of the speed sensor is coupled to an input of the other one of the first or the second clock signal generator means, in that said other clock signal generator means are adapted to derive a clock signal having a clock frequency in dependence upon the electric signal of the device, and in that the output of the detection means is coupled to an input of the control circuit for controlling the speed of the take-up reel.

In such a tape scanning apparatus, the buffer memory is intended to perform a time base correction on the signal read from the tape by the reproducing head. Moreover, the filling level of the buffer memory is used to control the tape speed. Particularly when the device with the friction roll according to the invention is used, a very satisfactory control can be realised so that it is even possible to reproduce analog compact cassettes at a HiFi quality.

In this respect it is to be noted that it is known from "Research Disclosure" of December 1993, pp. 805/6 to realise a combined time base correction and tape speed control when reading an audio signal in a tape scanning apparatus. However, in this case the write clock frequency is derived from the signal read from the tape. Hence, the known combined time base correction and tape speed control appears to operate less satisfactorily. However, the device using the friction roll according to the invention has such a large resolving power and is so accurate and reliable that it is the use of this device in the tape scanning apparatus that has led to a satisfactory realisation of the combined control.

BRIEF DESCRIPTION OF THE DRAWINGS

These and other aspects of the invention will be apparent from and elucidated with reference to the embodiments described hereinafter.

In the drawings

DETAILED DESCRIPTION OF THE PREFERRED EMBODIMENT

Figure 1:
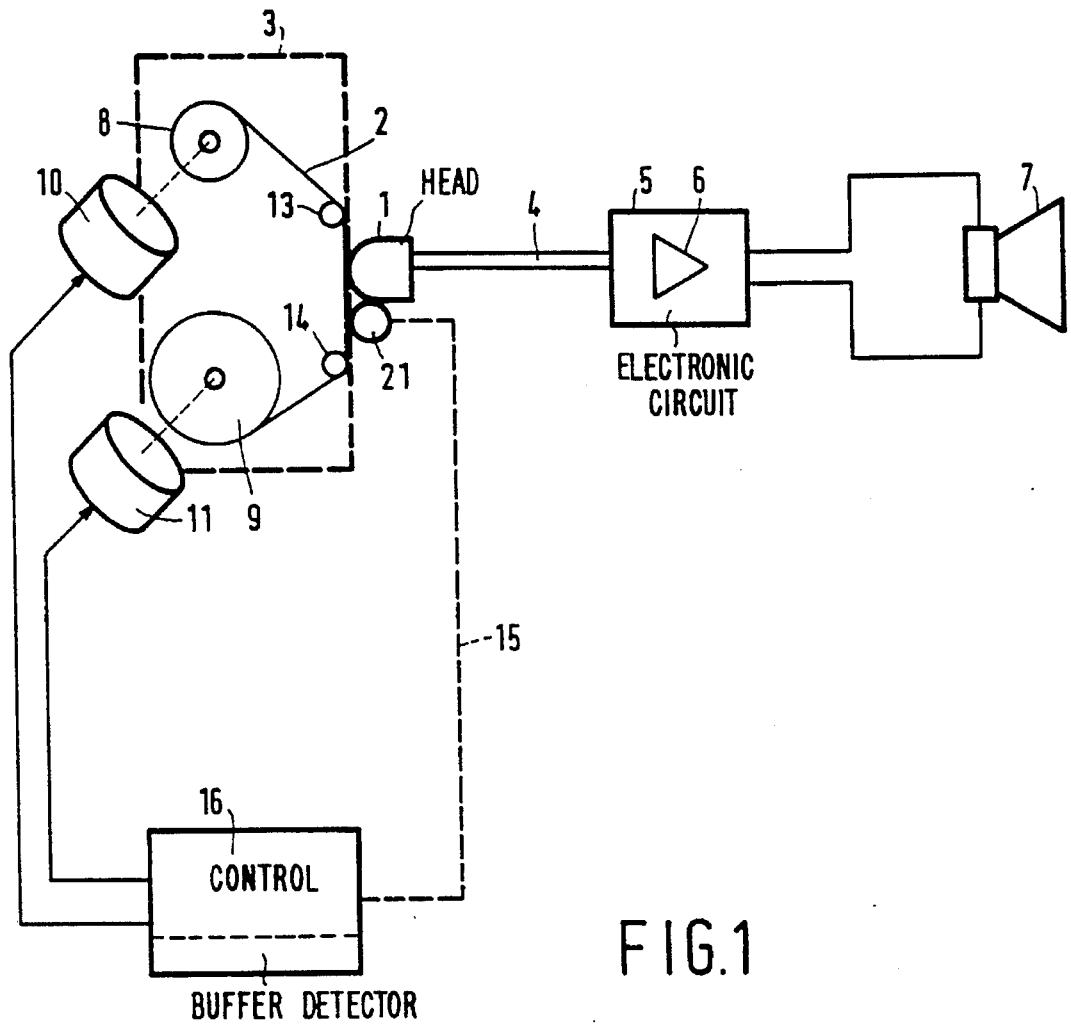
FIG. 1 shows a part of a tape scanning apparatus in which the angular velocity measuring device according to the invention can be used.

FIG. 1 shows components of a tape scanning apparatus which are relevant for understanding the present invention. This apparatus has a scanning head 1 which may comprise a plurality of scanning elements and with which information, for example audio or video information or data can be read from, written on or erased from a magnetic tape 2 which is accommodated in a cassette 3. The scanning head is coupled to a known electronic circuit 5 via an electric connection 4. This circuit comprises, inter alia an amplifier and decoding circuit 6 for the signal which has been read and, in the case of an audio tape scanning apparatus, it is connected to a loudspeaker 7 with which the audio signal which has been read is made audible. The audio tape scanning apparatus may be of the SDAT type or of the DCC type and details of such an apparatus have been described in, inter alia EP Patent Application 0,504,973.

The apparatus further comprises tape transport means in the form of reels 8 and 9 which are driven by motors 10 and 11 and a motor control circuit 16. During operation the tape is transported from a supply reel, for example reel 8 via the guide rolls 13 and 14 to a take-up reel, for example reel 9.

The tape may not only be a digital video or audio tape but also an analog video or audio tape and the invention can be used to great advantage, particularly in the latter case and generally in tape scanning apparatuses in which a disturbance referred to as jitter occurs. Moreover, the tape may not only be a magnetic tape but also an optical tape which may comprise an audio or video program or data. In the case of an optical tape the apparatus is not equipped with a magnetic scanning head but with an optical scanning head which may also comprise one or more scanning elements. The tape may alternatively be a magneto-optical tape, in which case the scanning head is provided with a magnetic coil as well as optical means for forming a scanning spot on the tape at the location of the magnetic coil, which spot is used both for writing and reading information.

According to the invention, all the above-mentioned apparatuses are provided with a tape speed measuring device which comprises, inter alia a friction roll which is driven by the tape. For the sake of simplicity only the friction roll 21 of the tape speed measuring device is shown in FIG. 1. As is diagrammatically shown by means of the connection 13 in FIG. 1, the output signal of this measuring device is applied to the control circuit 16 for the reel motors 10 and 11 so that the speed of revolution of these motors can be adapted to the tape speed measured at a position proximate to the scanning head 1 so that the tape speed can be kept constant at this head. The circuit 16 controls, for example one of the motors 10 and 11 at a given moment, while the associated reel functions as the take-up reel. Dependent on the direction of the tape travel, the two reels may function as the take-up reel or as the supply reel.

Figure 2:
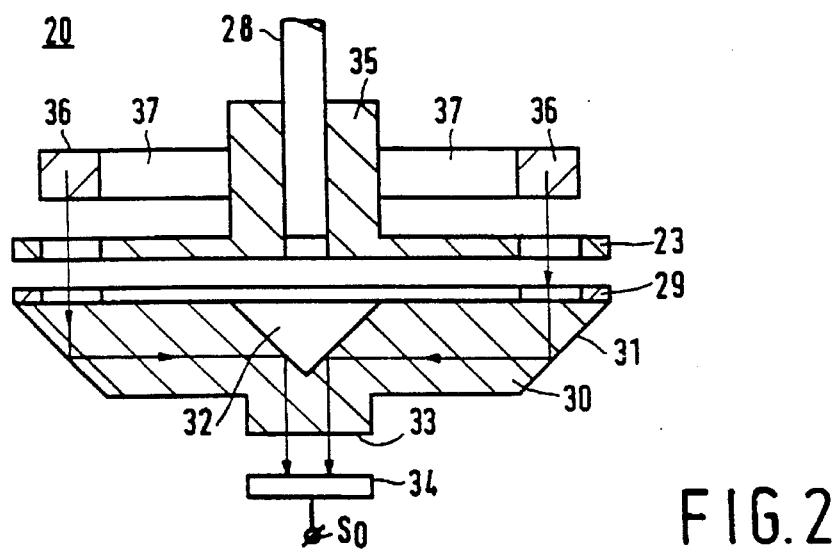
FIG. 2 shows the principle of this measuring device.
Figure 3:
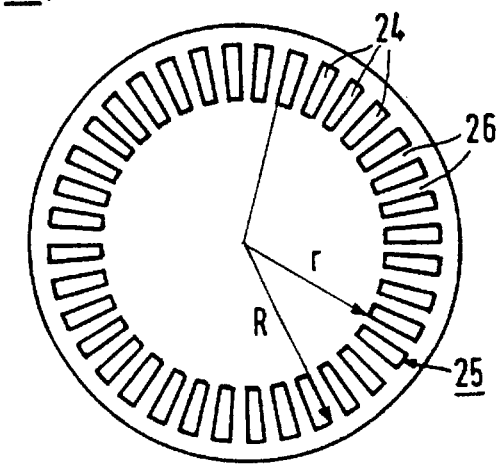
FIG. 3 shows a slotted disc to be used in this device.

The principle of the angular velocity measuring device according to the invention will now be described with reference to an embodiment using slotted discs, which embodiment is shown diagrammatically in FIG. 2. This embodiment comprises an opaque disc 23 which, as is shown in FIG. 3, is provided with a large number of slits 24. All these slits, only some of which are shown in FIG. 3, are arranged in a ring 25 having an inner radius r and an outer radius R. During operation this disc rotates at the same speed as the object whose angular velocity must be measured. To this end the disc is secured to a roll 35. This roll may be the object itself, if this object is, for example a friction roll. The roll then rotates about a shaft 28 which is clamped in the roll and by means of which the roll is journalled. The object may also be arranged at some distance from the slotted disc 23. In that case the shaft 28 is a drive shaft which is connected to the object. The shaft 28 may alternatively be a stationary shaft about which the roll rotates.

A second opaque disc 29, which is also provided with a large number of slits also arranged in a ring, is located opposite the slotted disc 23. The second slotted disc 29 may be identical to the first slotted disc 23, which is advantageous, inter alia from a manufacturing technical point of view. The second slotted disc is stationary. A radiation-guiding plate 30 having an oblique edge 31 is present below this disc and a conical reflector 32 is arranged in the centre of plate 30. A radiation exit aperture 33 is located opposite this reflector and a radiation-sensitive detector 34 is arranged behind said aperture.

The first slotted disc is irradiated from the top and the radiation passed through the slits 24 is incident on the second slotted disc 29 whose slits pass the radiation to the radiation-guiding plate 30. In this plate the radiation is guided towards the reflector 32 which reflects the radiation to the detector 34 via the aperture 33.

In the initial position of the slotted disc 23 its slits 24 are located, for example opposite the opaque pans 26 of the slotted disc 29 and a minimum quantity of radiation is passed to the radiation-guiding plate 30. When the disc 23 is rotated, its slits will overlap to an increasing extent with those of the disc 29. If there is total overlap, the quantity of radiation which is passed to the radiation-guiding plate 30 is maximum and the output signal $S_o$ of the detector 34 has a maximum value. When the disc 23 is further rotated, the quantity of passed radiation decreases again to said minimum level and subsequently increases again to said maximum level. When the disc 23 is rotated continuously, hence when the object is rotated, the output signal $S_0$ has a periodical, for example sinusoidal variation. The instantaneous period frequency of this signal is proportional to the instantaneous angular velocity of the object.

If the measuring radiation has a uniform intensity distribution, a rotation of the slotted disc 23 with respect to the slotted disc 29 will result in the same local intensity variation for each slit.

An annular illumination is preferably used so that the available radiation is utilized as efficiently as possible. The inner and the outer radius of the illumination ring shown diagrammatically by means of blocks 36 in FIG. 2 are preferably equal to those of the rings 25 on the slotted discs 23 and 29 so that there is no loss of radiation and the rings are irradiated completely. Moreover, there is minimal risk that radiation coming from the illumination ring can become interference radiation for the detector. If some tolerance is to be allowed in the mutual positioning of the slotted rings and the illumination ring, it is preferable to make the width of the illumination ring smaller than the width of the slotted rings. It is alternatively possible to make the width of the illumination ring larger than that of the slotted rings so as to obtain a desired position tolerance. The illumination ring may be stationary or move with the roll 35 as is diagrammatically shown by means of the connections 37 in FIG. 2. The illumination ring may be in the form of a lamp bent to a ring but is preferably realised in the form shown in FIGS. 5, 6 and 6b. The radiation-guiding plate 30 is preferably made of transparent synthetic material such as polymethyl methacrylate which is inexpensive, has a good optical quality and can easily be processed. However, the plate 30 may alternatively be made of glass.

It has been assumed in the foregoing that the slotted disc 29 is stationary. The absolute value of the angular velocity of the object can then be measured. Under circumstances it may be desirable to measure the relative angular velocity of this object with respect to a reference, for example the angular velocity of another object. The slotted disc 29 may then be arranged to rotate and be driven by, for example the second object, or rotate at a constant reference speed.

In the device according to the invention the functions of the slotted discs 23 and 29 may be interchanged, i.e. the disc 29 is driven by the object and the disc 23 is stationary or rotates at a reference speed.

Figure 4:
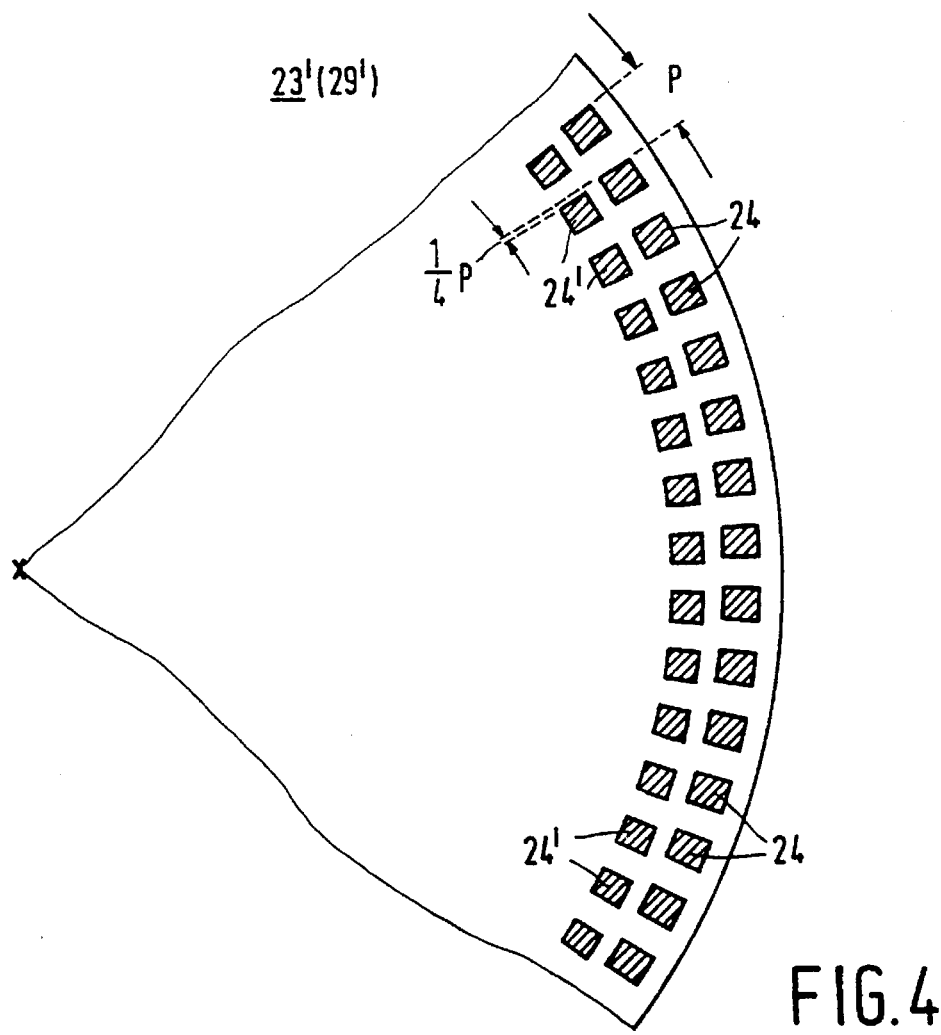
FIG. 4 shows a slotted disc with which also the direction of rotation of an object can be determined.

To detect not only the speed of the object but also its direction of rotation, a measure, which is known per se in the field of optical displacement sensors, may be used in the device according to the invention. To this end a second ring with slits, in addition to a first ring with slits, is provided on one of the discs and a second detector is used which receives only radiation from the second slotted ring, while the first detector receives only radiation from the first slotted ring. FIG. 4 shows a part of a disc with two slotted rings 25, 25'. These rings have the same tangential period P. However, the slits 24 in the ring 25 are tangentially offset over ¼ P with respect to the slits 24' in the ring 25'. The other slotted disc has one ring with slits which are long enough to cover both the slits 24 and the slits 24'. The other slotted disc may, however, alternatively have two rings with slits, the slits in the first ring being not offset with respect to those in the second ring. The output signals of the two detectors (not shown), one of which receives only radiation from the slits 24 and the other receives only radiation from the slits 24' exhibit a phase difference. By determining which of these signals is the leading signal, the direction of rotation of the disc 23, hence that of the object can be established.

To render the measured signal independent of inaccuracies or imperfections in the device or its components, for example, the intensity of the radiation source can be modulated at a low frequency. This has the same effect as a modulation at a constant frequency of the angular velocity of the rotatable disc. Consequently, a low-frequency modulation component will aim be superimposed on the detector signal. This provides the possibility of eliminating the influence of said inaccuracies or imperfections in, for example control circuit 16.

Another possibility of obtaining a measuring signal which is independent of imperfections is the use of a second radiation beam or reference beam from the same radiation source or from a second radiation source, which beam follows the same path through the device as the measuring radiation but does not pass through the slotted rings and is received by a reference detector. By subtracting the signals of the measuring detector and the reference detector, a corrected measuring signal is obtained.

The above-mentioned possibilities of:
a rotatable second disc with interruptions,
detecting the direction of rotation by means of a second ring with interruptions on one of the discs, and
obtaining a measuring signal which is independent of imperfections of the system
can be realised in all embodiments to be described hereinafter.

Figure 5:
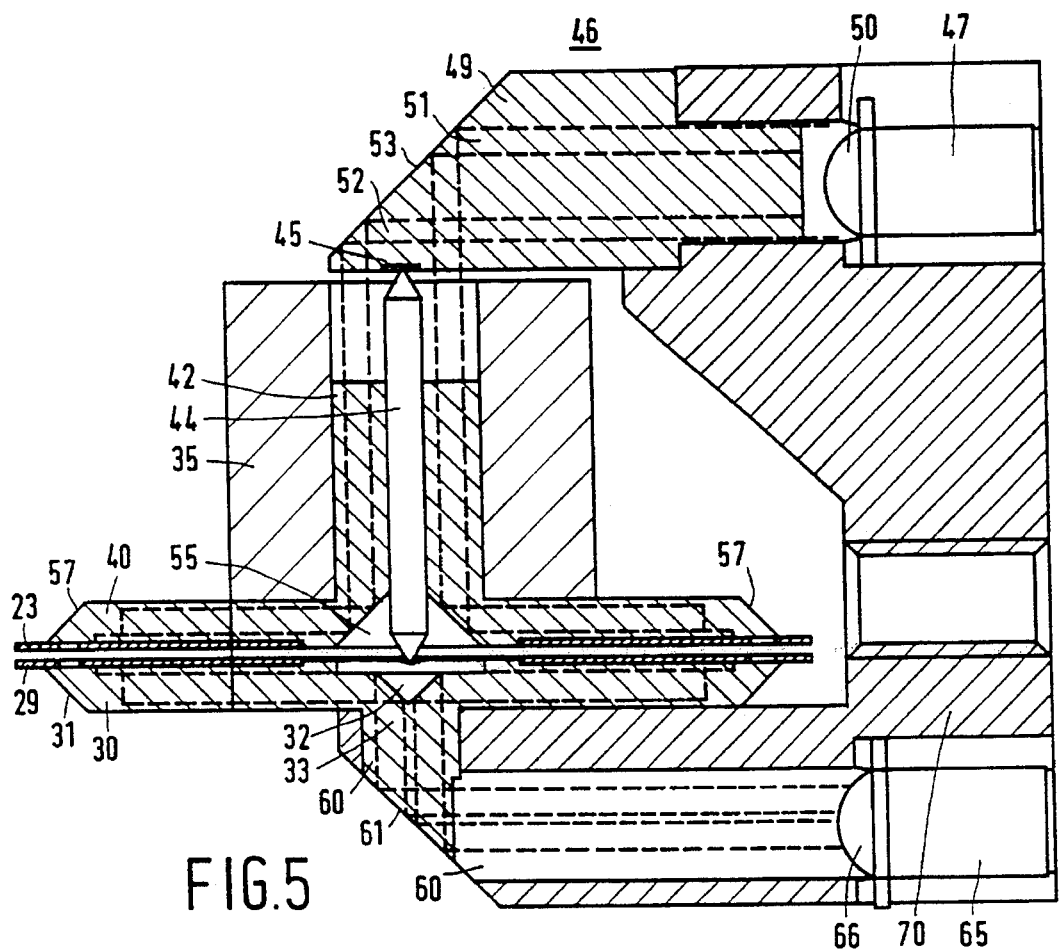
FIG. 5 shows a first embodiment of the measuring device.
Figure 6A:
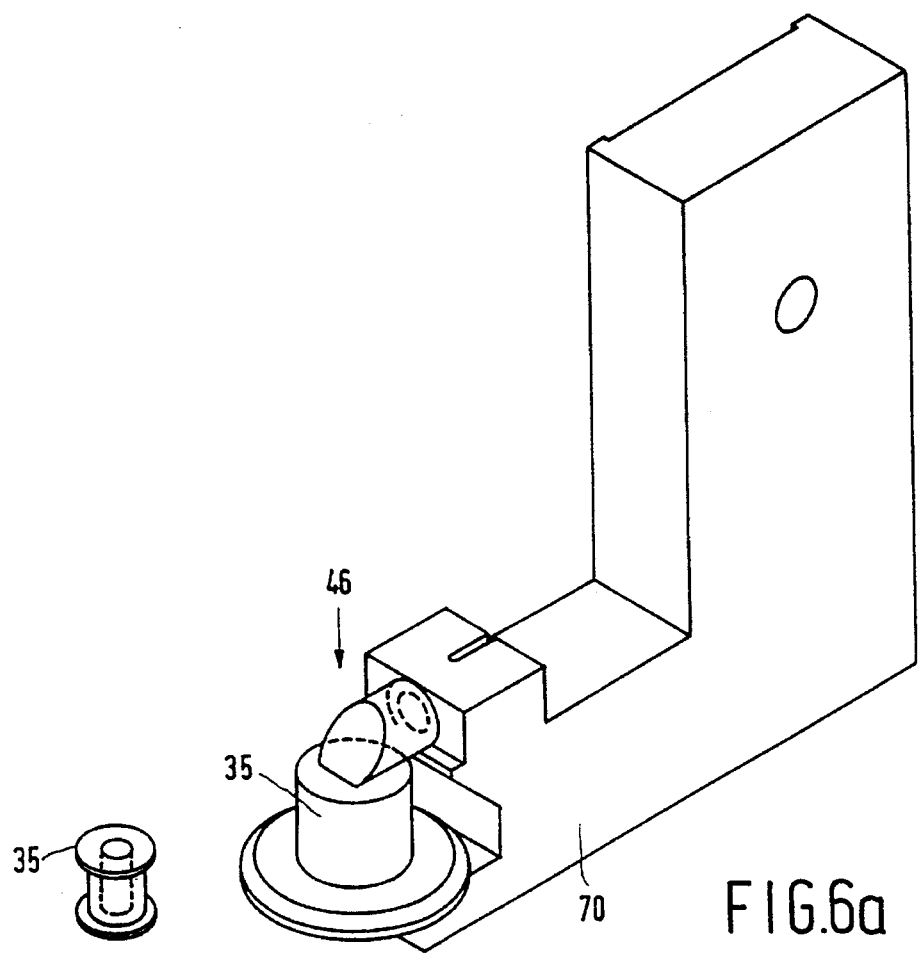
FIGS. 6a and 6b show constructive details of this measuring device for use in a tape scanning apparatus.
Figure 6B:
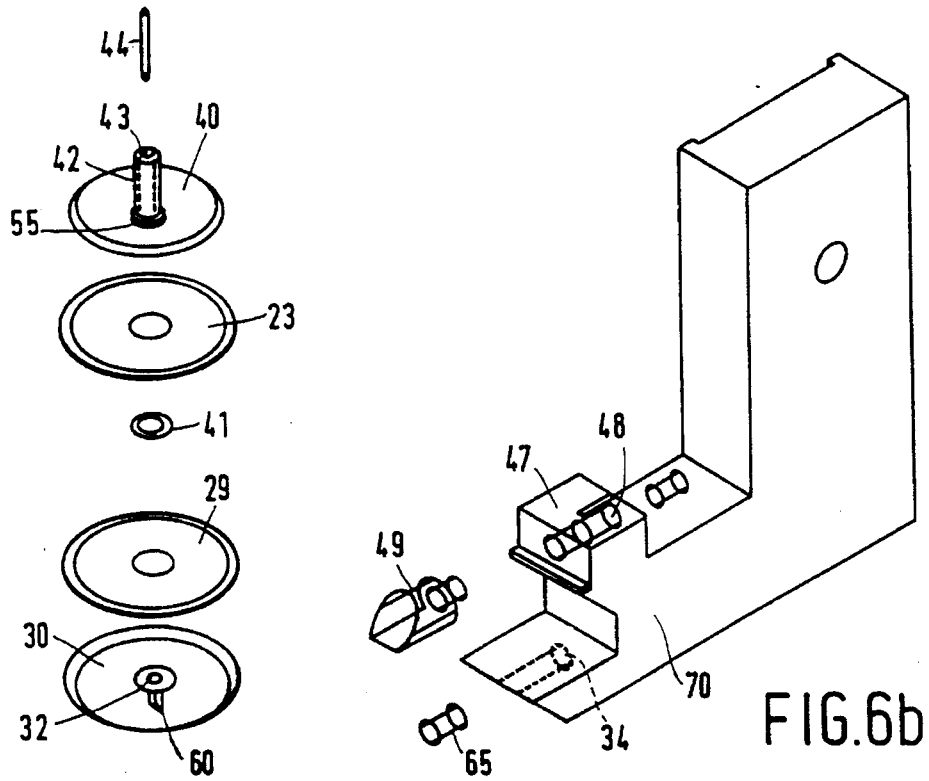

FIGS. 5, 6a and 6b show further constructive details of an embodiment of the measuring device in which the object is a friction roll which is driven, for example by a tape and is completely incorporated in the device. FIG. 5 is a cross-section, FIG. 6a is a perspective elevational view and FIG. 6b is also a perspective elevational view of elements of the device. The roll 35 is a thick-wailed hollow cylinder. A radiation-guiding plate 40 having an oblique edge 57 and preferably made of PMMA is secured to this roll. The radiation-guiding plate may alternatively be integral with the roll, as is shown in FIG. 5. The first slotted disc 23 is secured against the plate 40. The friction roll 35 incorporates a double-wailed tube 42 which moves with this roll. The central aperture 43 of the tube 42 accommodates a shaft 44. When the roll is driven, the tube 42 and the shaft 44 also rotate. This shaft, whose ends are pointed, is journalled in a membrane 41 which fits in the central aperture of the slotted disc 29 and in a plate 45 in the illumination housing 46 which forms part of the illumination system. The roll 35 may not only be journalled by means of the pivot beating shown in FIG. 5 but also by means of a ball bearing. A smooth beating should be used so that the tape can easily drive the roll 35. The other components of the illumination system are the cavity between the inner and outer wall of the tube 42 and the radiation-guiding plate 40.

The radiation housing comprises a compartment 47 for a radiation source 48, for example a light-emitting diode (LED) and a radiation guide 49 of, for example PMMA secured against this compartment. A lens 50 for concentrating the radiation emitted by the source 48 may be arranged at the transition between the compartment 47 and the radiation guide 49. This lens is, for example a collimator lens. Only two diametrical peripheral portions 51 and 52 of the measuring beam are shown by means of broken lines. The measuring beam radiation is reflected on the oblique end face 53 of the radiation guide via total internal reflection or through a reflection coating provided on this face. Radiation of the reflected measuring beam subsequently passes through the space between the inner wall and the outer wall of the tube 42 so that a beam having an annular cross-section is incident on the conical reflector 55. This reflector spreads the radiation in the horizontal plane over 360° and sends the radiation into the radiation-guiding plate 40. The oblique edge 57 of this plate reflects the radiation as a beam having an annular cross-section to the slotted discs 23 and 29. The radiation passed by the slits in these discs is passed into the radiation-guiding plate 30 via the oblique edge 31 of this plate. Subsequently, the radiation is reflected by the conical reflector 32 in this plate towards the aperture 33. At the location of this aperture a further radiation guide 60 is secured on the plate 30 for guiding the radiation, via reflection at the oblique side 61, to a detector 34 which is arranged in a detection housing 65. A lens 66 for concentrating the radiation on the detector may be arranged at the transition between this housing and the radiation guide 60.

By using various radiation guides, the radiation path from the source 48 to the detector 34 is shut off from its surroundings so that no radiation from the source gets lost and no ambient radiation can be incident on the detector. Consequently, a measuring signal is obtained which has a satisfactory signal-to-noise ratio and is not influenced by the surroundings.

The light housing 46 with the plate 45 and the detection system with the slotted disc 29 are secured to a common support 70. Since the shaft 44 of friction roll 35 and the slotted disc 23 are fixed on the plate 45 and the slotted disc 29, the slotted discs are journalled in a stable manner with respect to each other so that a stable and reliable measuring device is obtained. The angular velocity measuring device shown in FIGS. 5, 6a and 6b may be very compact so that this device can easily be built in.

In a realised embodiment of this device the slotted discs have a diameter of 1 cm. The period of the slit structure is approximately 80 μm and the slits have a length of approximately 350 μm. The entire device has a volume of approximately 1 cm$^3$. In the embodiment of FIG. 5 the radiation source and the detector are located in the same position, viewed in the horizontal direction. Consequently, these components can be provided on one printed circuit board which can be secured against the support 70, which is very advantageous from a constructional point of view.

Due to the large number of slits which can be provided on the discs, the resolving power of this device is approximately ten times larger than that of known angular velocity meters or tape speed meters. Due to the uniformity of the measuring radiation and the accuracy with which the device can be implemented, the accuracy with which the angular velocity can be determined is approximately a hundred times larger than that of known angular velocity meters or tape speed meters.

Figure 7:
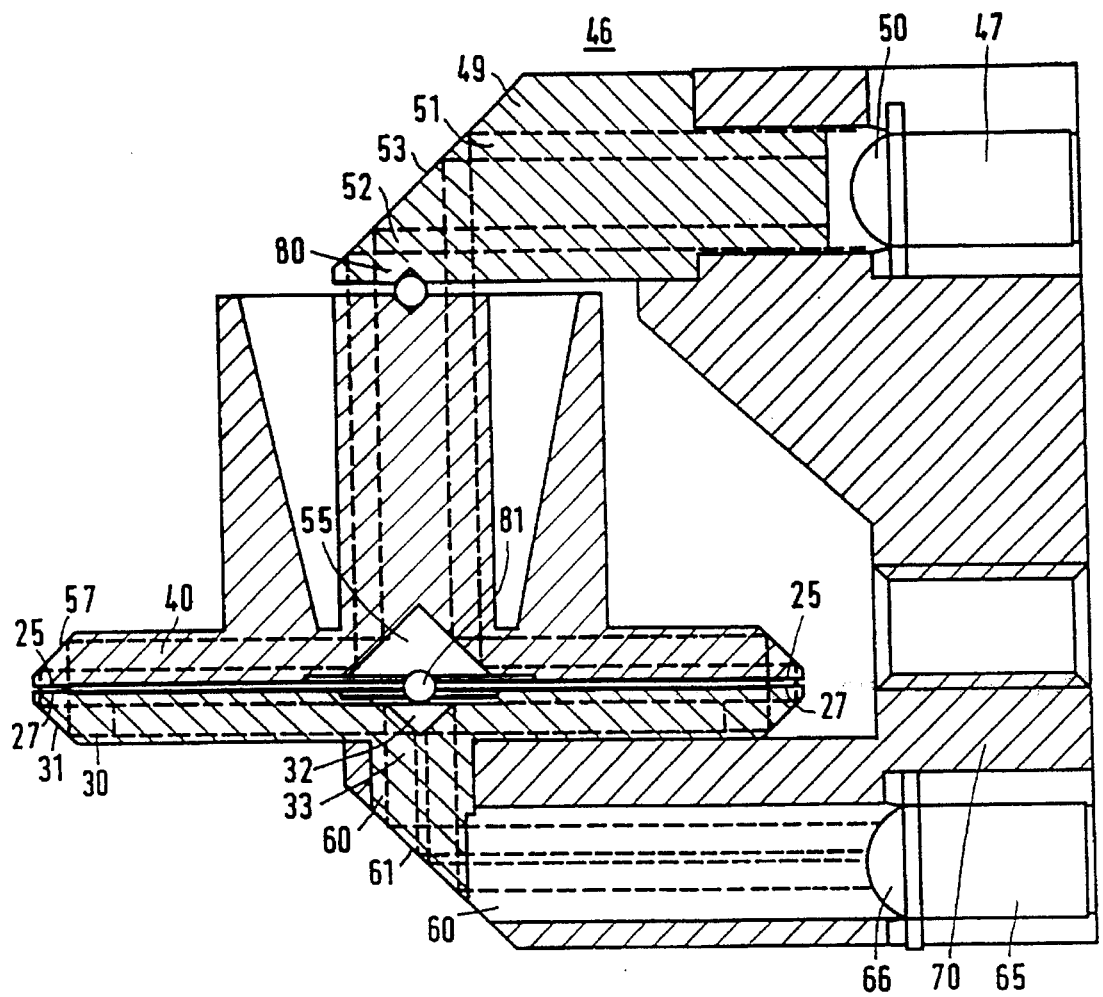
FIG. 7 shows an alternative embodiment of the measuring device.

FIG. 7 shows a second embodiment of the tape speed measuring device. The components of this device, which correspond to those of the device of FIG. 5, have the same reference numerals. The device of FIG. 7 is distinguished from that of FIG. 5 in that there are no separate slotted discs and in that the rings 25 and 27 with slits are provided in the radiation-guiding plates 40 and 30. Moreover, the radiation-guiding plate 40 is integral with the friction roll 35', and the assembly is made of a transparent synthetic material such as PMMA. The roll 35', which does not have a separate rotary shaft in this case, is journalled by means of ball bearings 80, 81 instead of pivot bearings. The roll 35' has two hollow spaces 82 and 83 between the central part 84 through which the measuring radiation passes and the peripheral parts 85 and 86. In the device of FIG. 7 the measuring radiation traverses the same path as in the device of FIG. 5. As compared with the device of FIG. 5, the device of FIG. 7 has the advantage that it is more integrated and can be assembled more easily.

The device of FIG. 7 is eminently suitable for use of different types of interruptions, for example grooves instead of slits. The fact is utilized that the radiation-guiding plates are total internal reflection plates, i.e. the radiation coupled into these plates remains trapped in these plates by total internal reflection on smooth plate surfaces. Radiation can emerge from the plate only at those positions where smoothness deviations occur, for example where hillocks or grooves are provided in the plate surface. Radiation can enter such a radiation-guiding plate such as plate 30 through the same hillocks or grooves.

Figure 8:
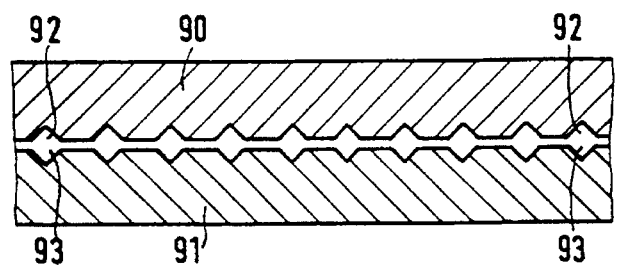
FIG. 8 shows parts of the radiation-guiding discs provided with interruptions for use in this device.

FIG. 8 shows, in a tangential cross-section, parts of radiation-guiding discs 90 or 91 which are provided with grooves 92 and 93 and can be used in the device of FIG. 7. Measuring radiation can emerge from the disc 90 via the grooves 92 and this radiation can enter the disc 91 via the grooves 93. The part of the radiation emerging via the grooves 92 and coupled into the disc 93, which part can thus reach the detector, is dependent on the tangential positions of the grooves 92 with respect to these positions of the grooves 93.

The grooves may be provided in the discs by scratching the relevant disc surface with a sharp chisel or a needle. A simple and inexpensive method of obtaining radiation-guiding discs with grooves or hillocks is the method starting from a master plate having a surface profile which is the minor image of the desired profile and by making a print of this plate via a replica process. The disc is then simultaneously shaped and the groove pattern is provided. This replica process is eminently suitable for mass manufacture, hence for consumer uses.

Figure 9:
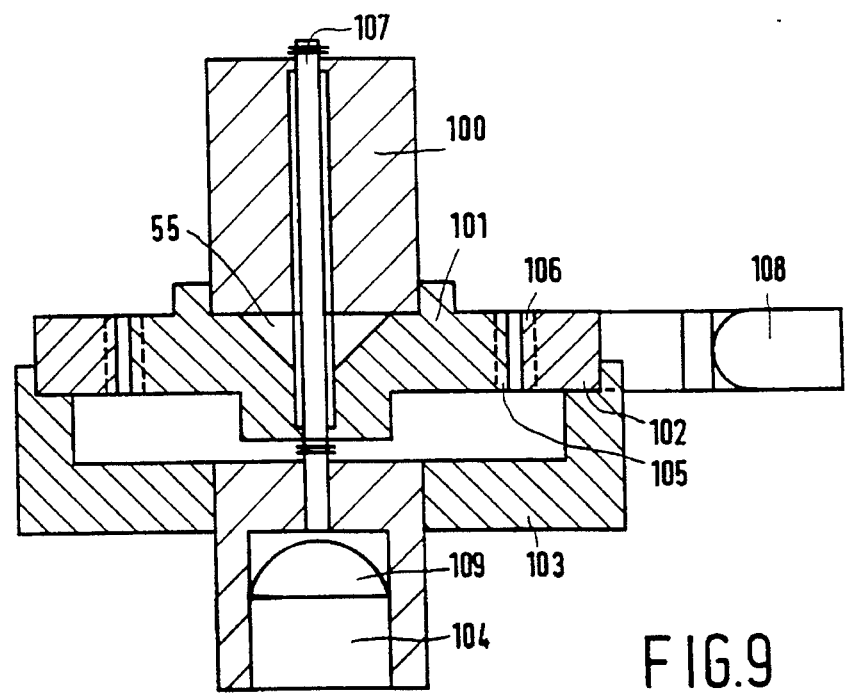
FIG. 9 shows an embodiment of the measuring device in which the interruption patterns are provided on the edges of the discs.

FIG. 9 shows diagrammatically an embodiment of the above-mentioned second class of devices for measuring the angular velocity of a roll. This roll 100 is secured to a first radiation-guiding disc 101 which moves with the roll. The second radiation-guiding disc is now an annular disc 102 which is secured, for example in a stationary manner on a support 103 in which also the detector 104 and possibly a lens 109 are provided. The major difference between this embodiment and the embodiments described hereinbefore is that the patterns of interruptions 105 and 106 are provided on the edges of the discs, while the longitudinal directions of the interruptions are parallel with the shaft 107 about which the roll 100 rotates. The interruptions may be slits or surface deformations such as grooves. A radiation source 108, for example a LED which passes its radiation into this disc is arranged opposite the outer side of the disc 102. Due to the rotationally symmetrical shape of this disc, the radiation is rendered uniform. The radiation emerging from the disc 102 via the pattern of interruptions 106 enters the disc 101 via the pattern of interruptions 105. This radiation reaches a conical reflector 55 which is arranged centrally in the disc 101 and reflects the radiation to the lens 109 and the detector placed behind it via the face 110 of the disc 101 in the radiation-transmitting parts 111, 112 of the support 103. During operation, the instantaneous quantity of radiation which is passed by the patterns of interruptions 106 and 105, and hence a quantity of radiation on the detector, is determined by the tangential positions of the interruptions of the pattern 106 with respect to those positions of the interruptions of the pattern 105. Consequently, the instantaneous frequency of the detector output signal is proportional to the instantaneous angular velocity of the roll 100 or of the instantaneous linear velocity of an object driving this roll, which object may be, for example a tape.

Figure 10A:
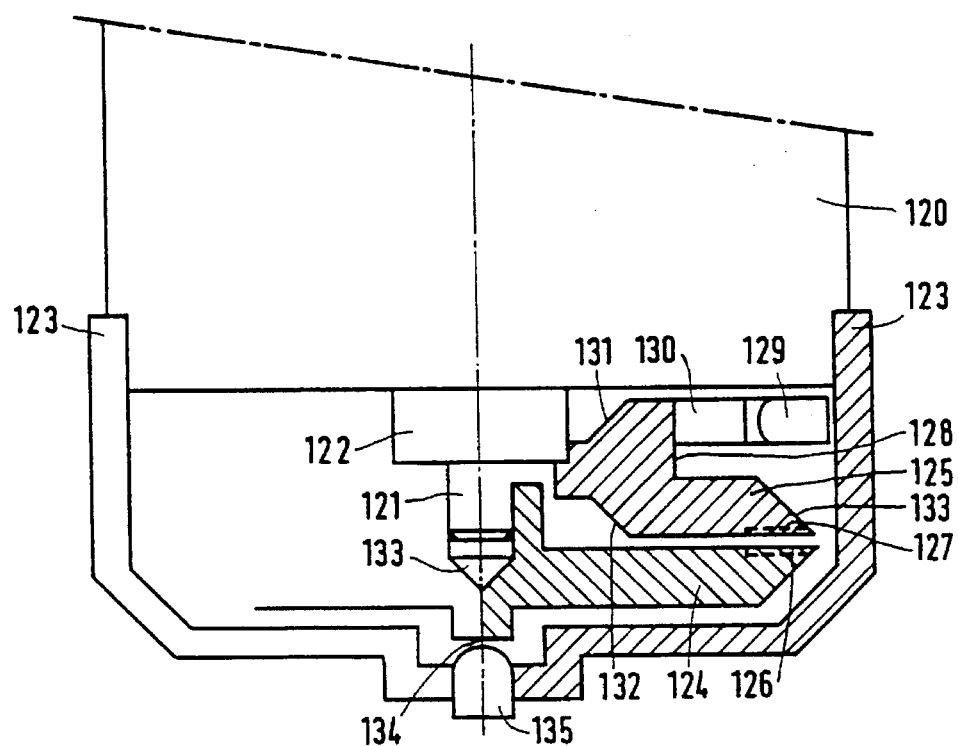
FIGS. 10a and 10b show a device analogous to that of FIG. 7 for measuring the speed of revolution of a motor.
Figure 10B:
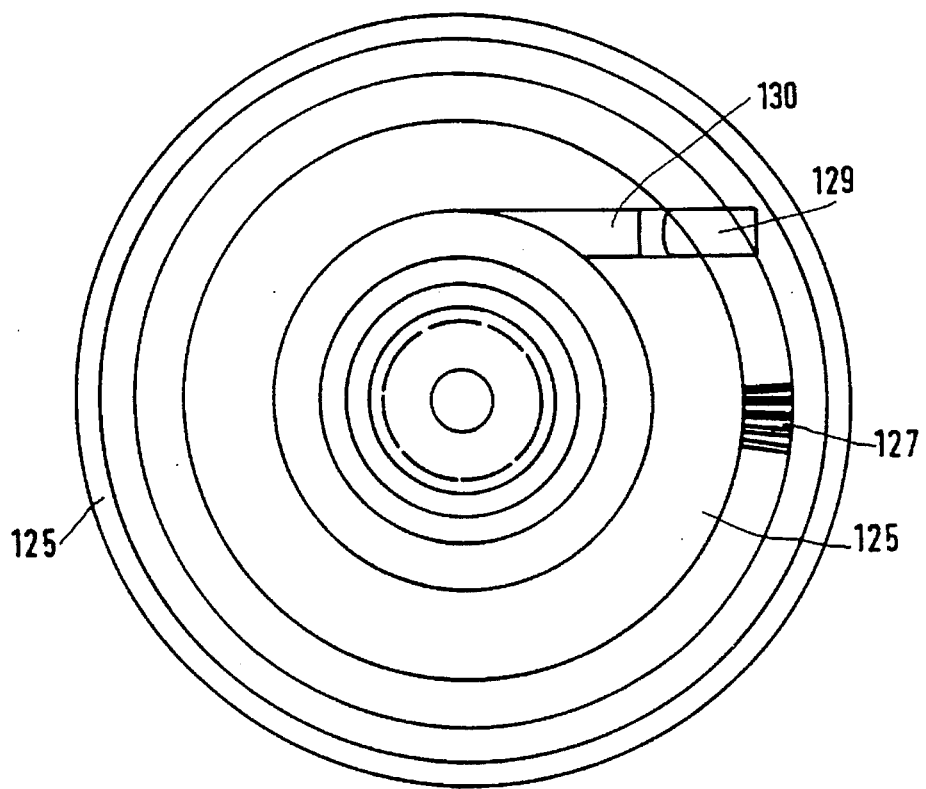

The speed of revolution of a motor may also be directly measured by means of the device according to the invention, which device can be combined with the motor because it is very compact. FIGS. 10a and 10b show an embodiment of such an assembly of motor and measuring device in a vertical and a horizontal cross-section, respectively. The shaft 121 projecting from the motor 120 is passed through a block 122 of a support 123. This shaft is secured in a first radiation-guiding disc 124 which thus moves with the motor shaft. The second radiation-guiding disc 125 is secured on the block 123. The two discs have annular patterns of interruptions 126 and 127 which may be slits or, for example grooves. A radiation source 129, whose radiation is coupled into the disc 125, possibly via a radiation guide 130, is arranged opposite a face 128 of the stationary radiation-guiding disc 125. Within this disc the radiation is rendered uniform because of the rotationally symmetrical shape of this disc. After reflections on the oblique sides 131,132 and 133 of the disc 125, the radiation is incident on the pattern 127. The radiation passed by this pattern enters the rotatable disc 124 via the pattern 126 and is passed therein towards a conical reflector 133. The reflected radiation emerges from the disc 124 via the face 134 and reaches the detector 135. The instantaneous frequency of the output signal of this detector is proportional again to the instantaneous angular velocity of the disc 124 and the motor 120.

Figure 11A:
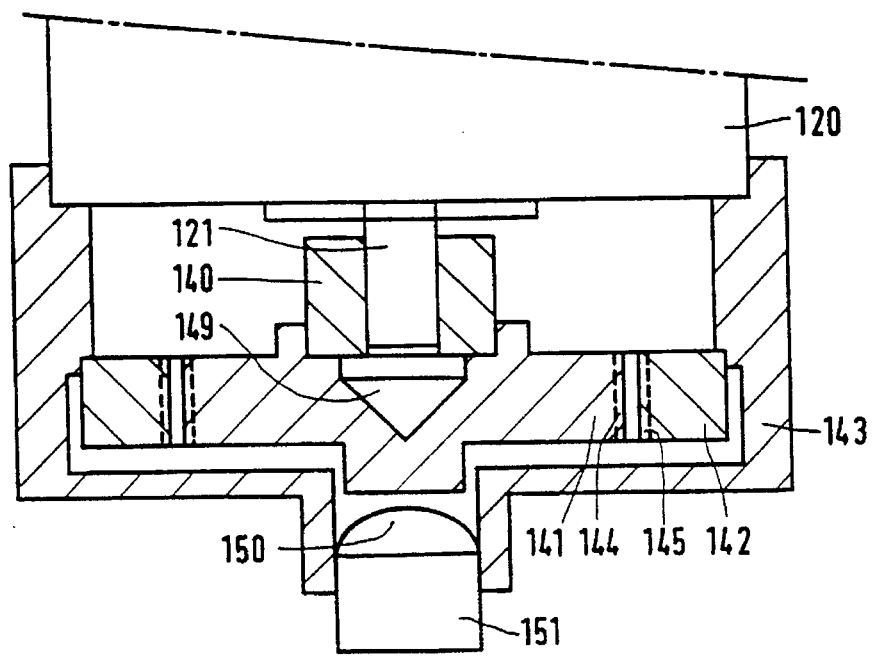
FIGS. 11a and 11b show a device analogous to that of FIG. 9 for measuring the speed of revolution of a motor.
Figure 11B:
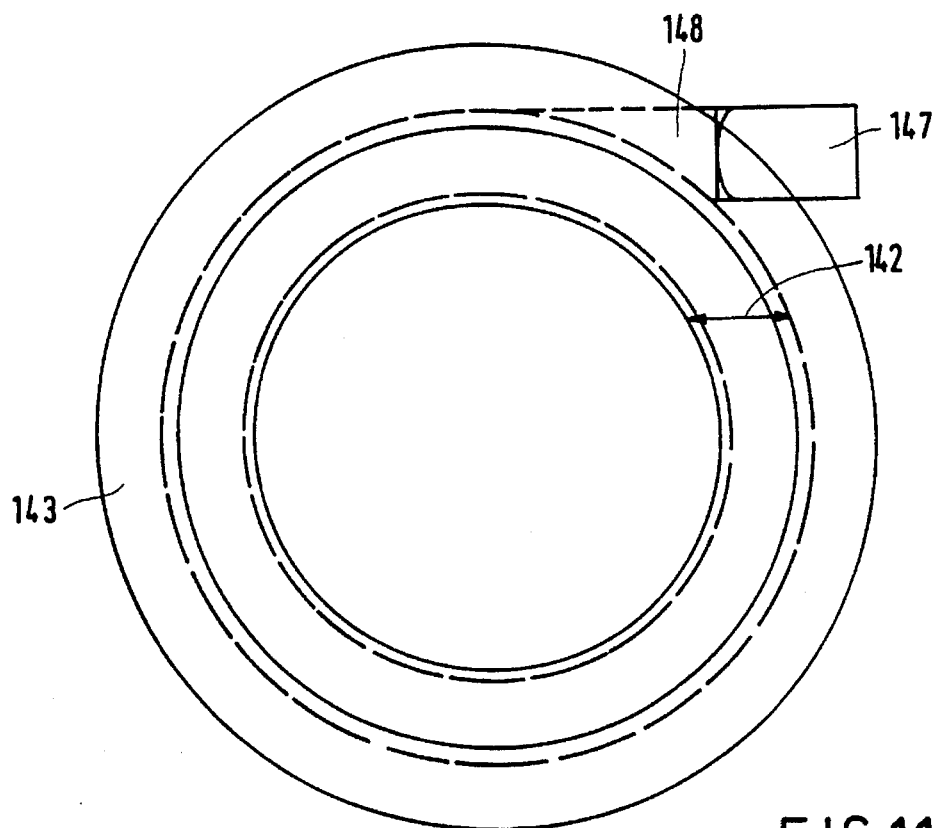

FIGS. 11a and 11b show a second embodiment of a device in a vertical and a horizontal cross-section, respectively, with which the speed of revolution of a motor can be measured directly. The shaft 121 projecting from the motor 120 is secured in a holder 140 which is connected to a first radiation-guiding disc 141 which moves with the shaft 121. A second annular, radiation-guiding disc 142 is arranged around the first round disc 141, which second disc is secured to a support 143. The patterns of interruptions 144 and 145, which may be slits or grooves, are arranged on the outer edge of the disc 141 and on the inner edge of the disc 142, respectively. The radiation source 147, for example a LED, is arranged in the support 143 and passes its radiation into the disc 142, possibly via a radiation guide 148. The radiation path through this device is analog to that through the device of FIG. 9, in which the elements 149, 150 and 151 in FIG. 11a have the same functions as the elements 55, 109 and 104 in FIG. 9.

In order to further enhance the accuracy of the device, a reference beam may be used in addition to the measuring beam. The reference beam may be supplied by a separate radiation source, but preferably comes from the source supplying the measuring beam. The reference beam traverses the same components as the measuring beam, with the exception of the patterns of interruptions, and is received by a separate detector separately from the measuring beam. Before the measuring radiation reaches the reflecting side 57 of the disc 40, a part of this measuring radiation may be coupled out of this disc as reference radiation in, for example, the device of FIG. 7 via, for example an annular groove in the disc or by means of a partially transparent reflector in the disc, and received by an extra detector arranged, for example in the disc 30. The measuring signal is now the difference between the output signals of the measuring detector and the reference detector. This signal is no longer influenced by possible inaccuracies of the components in the radiation path.

Figure 12:
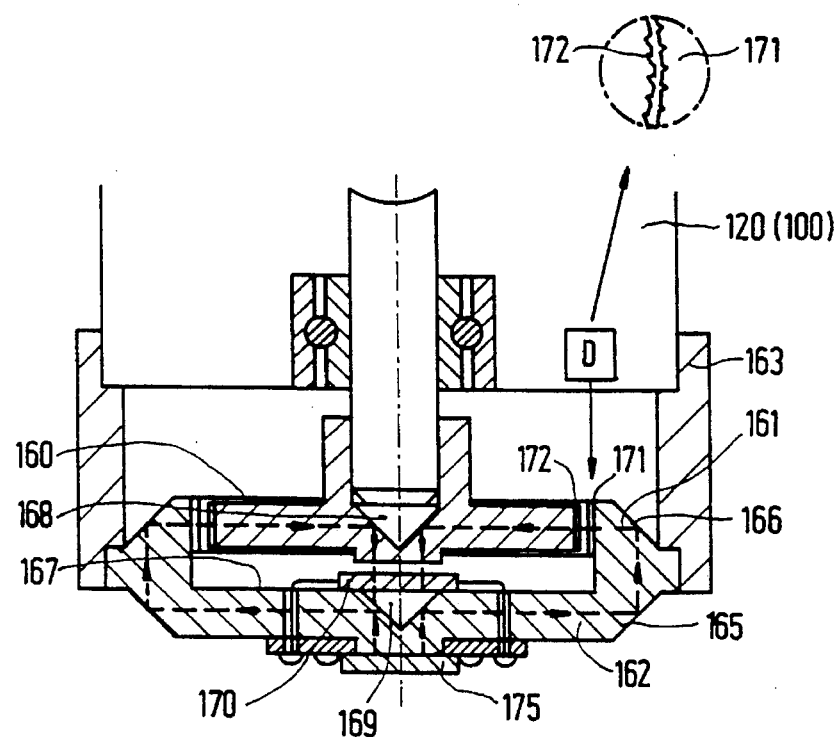
FIG. 12 shows a preferred embodiment of a measuring device for measuring, inter alia the speed of revolution of a motor.

FIG. 12 shows a preferred embodiment of the device with which the speed of revolution of a motor 120 or of a friction roll 100 can be measured and which has a round disc 160 and an annular disc 161. The disc 161 constitutes the raised annular edge of a stationary, radiation-guiding disc 162 which, in a cross-section, is U-shaped. If the round disc is driven by a motor 120, the disc 162 is connected to the motor housing via the tubular connection piece 163. As is shown in FIG. 12, the lower surface 164 of the disc 162 is provided with a radiation source 175, for example a LED whose radiation enters the disc 162 via a window. This radiation is incident on a conical reflector 169 which spreads the radiation in the horizontal plane through 360°. This radiation is reflected by the oblique faces 165 and 166 of the disc 162 and then reaches a pattern 171 of interruptions in the annular disc portion 161. The inset D of FIG. 12 shows a small portion of this pattern and of the opposite pattern 172 of interruptions in the driven disc 160. The pattern of interruptions may again be a pattern of grooves or a pattern of slits. The radiation through the patterns 171 and 172 is incident on a conical reflector 168 which reflects the radiation and concentrates it to a round beam. This beam is incident via a window in the disc 160 on a detector 170 which is arranged on the upper surface of the disc 162.

It is alternatively possible to interchange the positions of the radiation source 175 and the detector 170. Then the radiation traverses a path opposite to that shown in FIG. 12.

A more homogeneous illumination of the patterns 171 and 172 can be obtained with the device of FIG. 12, as compared with the device shown in FIGS. 9 and 11a, 11b, because this radiation covers a longer path through the radiation-guiding disc and is reflected several times on the inner side of this disc.

As already noted, the disc 160 may be driven by a friction roll instead of by a motor. Then the device of FIG. 12 may also be used for measuring linear velocities, for example those of a tape driving the friction roll.

Figure 13:
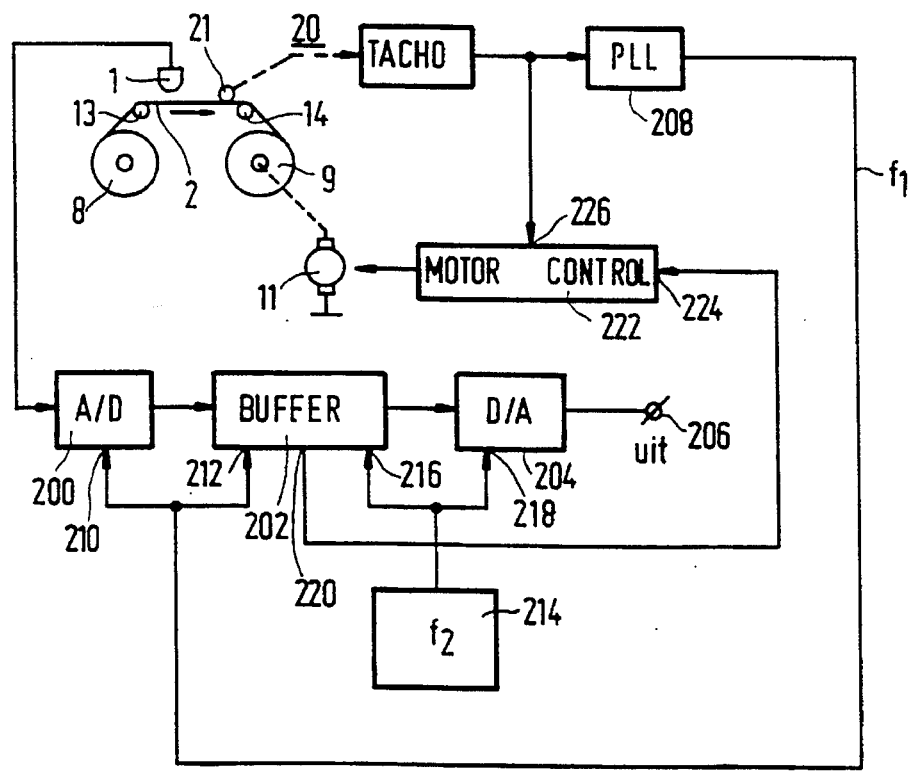
FIG. 13 shows an embodiment of the tape scanning apparatus according to the invention.

FIG. 13 shows an embodiment of a tape scanning apparatus, for example for playing analog compact cassettes. Only the relevant components of the tape scanning apparatus of FIG. 1 are shown in FIG. 13. The motor 11 is intended to drive the take-up reel 9 so that the magnetic tape 2 is moved in the direction of the arrow along the reproducing head 1 and the friction roll 21. The output of the reproducing head 1 is coupled to an input of an A/D converter 200, an output of which is coupled to an input of a buffer memory 202. An output of the buffer memory 202 is coupled to an input of a D/A converter 204, an output of which is coupled to an output terminal 206. The analog audio signal which is read from the tape 2 is available at the output terminal 206.

First clock signal generator means in the form of a phase-locked loop 208 are present, which loop derives a first clock signal having a frequency $f_1$ from the tacho pulses of the device 20 comprising the friction roll 21. This clock frequency $f_1$ is presented to clock signal inputs 210 and 212 of the A/D converter 200 and the buffer memory 202, respectively. Since the frequency $f_1$ of the tacho pulses is derived from the device 20, the value of the frequency $f_1$ will vary with the frequency variations of the tacho pulses and thus with the variations of the speed at which the tape 2 is moved along the friction roll 21.

Second clock signal generator means are present in the form of a frequency oscillator 214 which is adapted to generate a second clock frequency having a fixed value $f_2$. This clock frequency is presented to clock signal inputs 216 and 218 of the buffer memory 202 and the D/A converter 204, respectively. Moreover, the buffer memory 202 has an output 220 for supplying a control signal which indicates the filling level of the buffer memory 202. To this end the buffer memory 202 comprises detection means (not shown) for determining the filling level and for deriving the control signal in dependence thereon. The output 220 is coupled to an input 224 of a motor control unit 222. Moreover, the output of the device 20 may be coupled to a second input 226 of the control unit 222. In dependence on the control signals which are applied to the inputs 224 and 226, the motor control unit 222 supplies a motor control signal for the motor 11. The loop constituted by the feedback to the input 226 of the control unit 222 may then be considered as a speed control loop, while the loop constituted by the feedback to the input 224 of the control unit 222 may be considered as a phase-locked loop.

The tape scanning apparatus operates as follows. The buffer memory 202 is intended to perform a time base correction on the information signal which is read by the head 1. This signal is beset with time errors due to tape speed variations. Since the write clock frequency $f_1$ is derived from the tacho pulses of the device 20, this frequency is similarly dependent on these tape speed variations. Consequently, the signal of the frequency $f_1$ read by the reproducing head 1 is sampled in the A/D converter 200 and also written into the buffer memory 202 at this frequency. If the tape travels at a faster speed, the frequency $f_1$ will increase, and conversely. Since the samples are read at the fixed frequency $f_2$, the signal at the output terminal 206 is freed from the previously mentioned variations.

If the tape travels at a faster speed, more samples of the information signal will thus be stored in the buffer memory 202 within one and the same time interval. If, on average, the write frequency $f_1$ is consequently higher than the read frequency $f_2$, the buffer memory 202 will overflow at a given moment. To prevent this, the control loop is provided from the output 220 to the motor control unit 222. This control loop ensures that the buffer memory 202 has such a filling level that the buffer memory 202 is half full on average. If the tape is moved at such a speed that $f_1$ is larger than $f_2$, the filling level of the buffer memory 202 will become larger than ½. Now such a control signal is applied to the motor control unit 222 that the speed is slowed down.

It will be obvious that the filling level will be lower than ½ if the transport speed becomes too low. Consequently, the speed is increased by the control loop.

A combined time base correction and tape speed control as described with reference to FIG. 13 is possible because the device 20 with the friction roll 21 has such a large resolving power and is accurate and reliable. Moreover, the friction roll has the advantage that also in trick modes, in which the speed of the record carrier is (many times) higher than the nominal playback speed, the speed control still functions because the friction roll is then still in contact with the magnetic tape 2.

It is to be noted that the write frequency $f_1$ may also be given a fixed value. In that case the read frequency $f_2$ must be derived from the tacho pulses of the device 20.

The invention has been described with reference to its use as a tape speed meter in a tape scanning apparatus, but it may alternatively be used in other apparatuses in which the linear movement of an elongated object which can drive a friction roll is to be measured with great accuracy, for example in a plotter. As has also been described, the invention may alternatively be used for directly measuring the speed of revolution of a motor, for example a reel-driving motor in a tape scanning apparatus. Moreover, the invention can generally be used wherever an accurate and compact device is required for measuring rotation of components or objects. Examples are robots, tools, angle sensors in anti-blocking brake systems in vehicles, etc.

We claim:

1. A device for optically measuring the velocity of an object, comprising:
    a first disc arranged to be driven rotatably by the object such that the angular velocity of the first disc is a measure of the velocity of said object, wherein said disc has a pattern of elongated interruptions in a first disc face, and said pattern is periodical and rotationally symmetrical,
    a second disc having elongated interruptions in a second disc face, arranged in said pattern,
    an illumination system for simultaneously illuminating the complete pattern of each of said faces, and
    a detection system,
    characterized in that
    the illumination system comprises a radiation source in the form of a diode, and a radiation guide which concentrates the radiation from the source to a first beam whose cross-section corresponds to said pattern, and
    said detection system is constituted by a radiation guide for receiving radiation which is part of said first beam and has passed through the interruptions of each complete pattern, and for concentrating the received radiation to a second beam having a circular cross section, and
    a single detector for converting the intensity variation of said second beam into an electric signal which is a measure of the velocity of said object.

2. A device as claimed in claim 1, characterized in that the second disc is arranged to be stationary.

3. A device as claimed in claim 1, characterized in that the second disc is driven at a constant angular velocity.

4. A device as claimed in claim 1, characterized in that the velocity of said object is a rotational velocity.

5. A device as claimed in claim 1, characterized in that one of the discs is a round radiation-guiding disc having a cylindrical portion having an outer edge surface whose pattern of interruptions is provided on the outer edge surface, and the other disc is an annular radiation-guiding disc having a cylindrical portion including an outer side and an inner edge surface arranged around the outer edge surface of said one of the discs, the pattern of interruptions of said other disc being provided on the inner edge surface.

6. A device as claimed in claim 5, characterized in that the illumination system is comprises the annular disc and a radiation source located opposite the outer side of said disc, and in that the round disc is provided with a conical reflector and forms part of the radiation-collecting system.

7. A device as claimed in claim 5, characterized in that the annular disc is constituted by the raised edge of a radiation-guiding disc which is U-shaped in cross-section and is internally provided with a conical reflector, while one of its disc surfaces supports the radiation source and the other disc surface supports the detector, and in that the round disc is provided with a reflector.

8. A device as claimed in claim 1, characterized in that the first and second discs are round discs which are arranged opposite each other and in that the patterns of interruptions on these discs are annular patterns.

9. A device as claimed in claim 8, characterized in that:
    the two discs are radiation-guiding discs, one of which forms part of the illumination system and the other of which forms part of the detection system, radiation is trapped within the discs due to total internal reflection where there are no interruptions, and radiation emerges from said one disc through the respective pattern of interruptions on said one disc, and radiation can enter said other disc through the respective pattern of interruptions on said other disc.

10. A device as claimed in claim 1, characterized in that the interruptions are constituted by deformations in a smooth disc surface.

11. A device as claimed in claim 1, characterized in that the interruptions are constituted by transparent slits in an opaque disc surface.

12. A device as claimed in claim 5, characterized in that at least one of the discs is made of a transparent synthetic material.

13. A device as claimed in claim 8, characterized in that:
the discs are opaque and the interruptions are constituted by slits in said discs, and the illumination system is arranged to supply a beam having an annular cross section having an inner radius and an outer radius at least equal to corresponding radii of the respective annular patterns of slits in the first and second discs.

14. A device as claimed in claim 1, characterized in that the respective interruptions are constituted by respective deformations in respective smooth disc surfaces.

15. A device as claimed in claim 1, characterized in that the respective interruptions are constituted by respective transparent slits in respective smooth disc surfaces.

16. A device as claimed in claim 13, characterized in that the illumination system successively comprises a radiation source, a first radiation guide, and a rotatable radiation-guiding disc which is one of said first and second discs and has an oblique reflecting edge and is arranged proximate and parallel to the rotatable disc.

17. A device as claimed in claim 16, characterized in that detection system comprises a second radiation-guiding disc which is the other of said first and second discs and has a centrally arranged conical reflector and an oblique reflecting edge.

18. A device as claimed in claim 17, characterized in that at least one of the two radiation-guiding discs is made of a transparent synthetic material.

19. A device as claimed in claim 17, characterized in that a second radiation guide for guiding the radiation from the conical reflector to the detector is arranged between the second radiation-guiding disc and the detector.

20. A device as claimed in claim 19, characterized in that the radiation source, the first radiation guide, the second radiation-guiding disc, the second radiation guide and the detector are arranged in a U shape and that a part of the first radiation guide constitutes the central portion of the U and has the shape of a hollow tube for accommodating a rotary shaft.

21. A device as claimed in claim 17, characterized in that the first disc is a friction roll which is driven by a moving elongated object.

22. A device for optically measuring the velocity of an object, comprising:

a first disc arranged to be driven rotatably about an axis by the object such that the angular velocity of the first disc is a measure of the velocity of said object, wherein said disc has a pattern of elongated interruptions in a first disc face, and said pattern is periodical and rotationally symmetrical about said axis, a second disc having elongated interruptions in a second disc face, arranged in said pattern, an illumination system for simultaneously illuminating the complete pattern of each of said faces, and a detection system,
characterized in that the illumination system comprises a radiation source in the form of a diode, and a first radiation guide which concentrates the radiation from the source to a beam whose cross-section corresponds to said pattern, the pattern on one of said faces is divided into a first and a second sub-pattern of interruptions whose periods are equal, said sub-patterns being periodical and rotationally symmetrical, positions of the second sub-pattern being offset with respect to the positions of the interruptions of the first sub-pattern, and said detection system is constituted by a second radiation guide for receiving radiation, coming from the illumination system and passing through the interruptions of each complete pattern, and for concentrating this radiation to a beam having a circular cross section; a first detector for receiving radiation passing through the first sub-pattern and the pattern of the other disc for converting the intensity variation of the radiation received by the first detector into an electric signal, and a second detector for receiving radiation passing through the second sub-pattern and the pattern of the other disc for converting the intensity variation of the radiation received by thesecond detector into an electric signal which is a measure of the velocity of said object.

23. A device as claimed in claim 22, characterized in that said second sub-pattern is offset a distance equal to one fourth of the period of the sub-patterns with respect to the positions of the interruptions of the first sub-pattern.

24. A tape scanning apparatus provided with two reels to be used as a supply reel and a take-up reel, a scanning head arranged in a path covered by the tape between the two reels, a tape speed sensor, and a control circuit for controlling the speed of the reel functioning as the take-up reel, characterized in that the tape speed sensor is a device for optically measuring the velocity of an object, comprising:

a first disc arranged as a friction roll to be driven rotatably by the tape such that the angular velocity of the first disc is a measure of the velocity of the tape, wherein said disc has a pattern of elongated interruptions in a first disc face, and said pattern is periodical and rotationally symmetrical, a second disc having elongated interruptions in a second disc face, arranged in said pattern, an illumination system for simultaneously illuminating the complete pattern of each of said faces, and a detection system,
and further characterized in that the illumination system comprises a radiation source in the form of a diode, and a radiation guide which concentrates the radiation from the source to a first beam whose cross-section corresponds to said pattern, and said detection system is constituted by a radiation guide for receiving radiation which is part of said first beam and has passed through the interruptions of each complete pattern, and for concentrating the received radiation to a second beam having a circular cross section, and a single detector for converting the intensity variation of said second beam into an electric signal which is a measure of the velocity of said tape.

25. A tape scanning apparatus as claimed in claim 24, further comprising
- a reproducing head for reproducing an information signal recorded on the tape,
- a buffer memory, an input of which is coupled to an output of the reproducing head and an output of which is coupled to an output terminal for supplying the information signal,
- first clock signal generator means for generating and supplying a first clock signal having a first clock frequency at an output which is coupled to a write clock signal input of the buffer memory, said buffer memory being adapted to store the information signal in response to the first clock signal,
- second clock signal generator means for generating and supplying a second clock signal having a second clock frequency at an output which is coupled to a read clock signal input of the buffer memory, said buffer memory being adapted to supply the information signal stored in the buffer memory at the output in response to the second clock signal, one of the first or the second clock signal generator means being adapted to generate a clock signal having a fixed clock frequency,
- detection means for determining a filling level of the buffer memory and for supplying a control signal at an output, which control signal is a measure of the filling level of the buffer memory, characterized in that an output of the speed sensor is coupled to an input of the other one of the first or the second clock signal generator means, in that said other clock signal generator means are adapted to derive a clock signal having a clock frequency in dependence upon the electric signal of the device, and in that the output of the detection means is coupled to an input of the control circuit for controlling the speed of the take-up reel.

26. A rope scanning apparatus as claimed in claim 25, characterized in that the tape scanning apparatus is of the analog type for reproducing an analog information signal recorded on the tape, in that the apparatus comprises an A/D converter which is arranged between the output of the reproducing head and the input of the buffer memory, and a D/A converter which is arranged between the output of the buffer memory and the output terminal, in that the A/D converter has a clock signal input which is coupled to the output of the first clock signal generator means and the D/A converter has a clock signal input which is coupled to the output of the second clock signal generator means.

* * * * *